US007533505B2

(12) United States Patent
 Henderson

(10) Patent No.: US 7,533,505 B2
(45) Date of Patent: May 19, 2009

(54) PILE ANCHOR FOUNDATION

(76) Inventor: Allan P. Henderson, 2005 Airport Dr., Bakersfield, CA (US) 93308

( * ) Notice: Subject to any disclaimer, the term of this patent is extended or adjusted under 35 U.S.C. 154(b) by 611 days.

(21) Appl. No.: 10/734,281

(22) Filed: Dec. 15, 2003

(65) Prior Publication Data

US 2004/0131428 A1 Jul. 8, 2004

(51) Int. Cl.
 *E02D 27/00* (2006.01)
(52) U.S. Cl. ............................ 52/292; 52/294; 52/295; 52/296; 52/155; 52/156; 405/228; 405/244; 405/232; 405/252.1; 405/229; 405/239
(58) Field of Classification Search .................... 52/111, 52/153, 156–158, 166, 169.9, 292–299, 741.15, 52/745.04, 745.17; 405/228–229, 232–233, 405/236–239, 242, 244, 249, 252.1
See application file for complete search history.

(56) References Cited

U.S. PATENT DOCUMENTS

| | | | |
|---|---|---|---|
| 1,048,993 A | 12/1912 | Meriwether | |
| 2,162,108 A | 6/1939 | Newman | 61/57 |
| 2,374,624 A | 4/1945 | Schwendt | 72/77 |
| 2,706,498 A | 4/1955 | Upson | 138/84 |
| 2,724,261 A | 11/1955 | Rensaa | 72/107 |
| 3,186,181 A | 6/1965 | Snow et al. | 61/53.5 |
| 3,382,680 A | 5/1968 | Takano | 61/56 |
| 3,559,412 A | 2/1971 | Fuller | 61/53.6 |
| 3,600,865 A | 8/1971 | Vanich | 52/73 |
| 3,793,794 A | 2/1974 | Archer et al. | 52/632 |
| 3,839,874 A | 10/1974 | Wyant | 61/53.52 |
| 3,842,608 A | 10/1974 | Turzillo | 61/53.52 |
| 3,916,635 A * | 11/1975 | Lynch et al. | 405/253 |
| 3,963,056 A | 6/1976 | Shibuya et al. | 138/175 |
| 3,963,065 A | 6/1976 | Dauwalder | 151/41.76 |

(Continued)

FOREIGN PATENT DOCUMENTS

DE 27 58 489 11/1978

(Continued)

OTHER PUBLICATIONS

Patent Abstracts of Japan, 55122916, Sep. 22, 1980, Keizo.

(Continued)

*Primary Examiner*—Jeanette Chapman
(74) *Attorney, Agent, or Firm*—Jacobson Holman PLLC

(57) ABSTRACT

A circular concrete cap foundation poured in-situ within a perimeter forming corrugated metal pipe set atop or within an excavated pit and enclosing a series of circumferentially spaced pile anchors. The circular concrete cap foundation supports sets of inner and outer circumferentially spaced tower anchor bolts having their lower ends anchored to an embedded anchor ring and their upper ends projecting vertically and upwardly out the top of the circular foundation to engage the base flange of a supported tower. The pile anchors are formed with perimeter corrugated metal pipes set deep in subsurface soils with cementitious material surrounding and partially bonding to a centralized steel bolt or tendon which extends through the cap foundation. The tower anchor bolts and the pile anchor bolts are both partially encased in a PVC sleeve so that the bolts can be post-tensioned. The pile anchors are in tension only and serve to pull the cap foundation down to compress the underlying ground soils.

25 Claims, 4 Drawing Sheets

U.S. PATENT DOCUMENTS

| | | | |
|---|---|---|---|
| 4,038,827 A | 8/1977 | Pryke | 61/53.62 |
| 4,060,994 A * | 12/1977 | Chitis | 405/238 |
| 4,217,738 A | 8/1980 | Smith | 52/40 |
| 4,228,627 A | 10/1980 | O'Neill | 52/295 |
| 4,232,846 A | 11/1980 | Bressani | 248/158 |
| 4,287,691 A | 9/1981 | Guenther | 52/97 |
| 4,618,287 A | 10/1986 | Kinnan | 405/232 |
| 4,842,447 A | 6/1989 | Lin | 405/243 |
| 4,910,940 A | 3/1990 | Grady, II | 52/726 |
| 5,131,790 A | 7/1992 | Simpson | 405/236 |
| 5,228,806 A | 7/1993 | De Medieros, Jr. et al. | 405/231 |
| 5,231,808 A | 8/1993 | Angelette | 52/122.1 |
| 5,289,626 A * | 3/1994 | Mochida et al. | 29/452 |
| 5,379,563 A | 1/1995 | Tinsley | 52/295 |
| 5,474,399 A * | 12/1995 | Chia-Hsiung | 405/229 |
| 5,586,417 A * | 12/1996 | Henderson et al. | 52/295 |
| 5,625,988 A | 5/1997 | Killick | 52/298 |
| 5,678,382 A | 10/1997 | Naito | 52/745.21 |
| 5,761,875 A | 6/1998 | Oliphant et al. | 52/721.2 |
| 5,826,387 A | 10/1998 | Henderson et al. | 52/295 |
| 5,878,540 A | 3/1999 | Morstein | 52/296 |
| 5,960,597 A | 10/1999 | Schwager | 52/223.4 |
| 6,119,425 A | 9/2000 | Shimonohara | 52/439 |
| 6,216,414 B1 | 4/2001 | Feldberg | 52/736.1 |
| 6,270,308 B1 | 8/2001 | Groppel | 415/4.3 |
| 6,665,990 B1 * | 12/2003 | Cody et al. | 52/295 |
| 6,672,023 B2 | 1/2004 | Henderson | 52/296 |

FOREIGN PATENT DOCUMENTS

| | | |
|---|---|---|
| FR | 1463696 | 1/1966 |
| FR | 2030478 | 11/1970 |
| JP | 58 166195 | 10/1983 |
| JP | 6 316942 | 11/1994 |

OTHER PUBLICATIONS

Patent Abstracts of Japan, 59150830, Aug. 29, 1984, Asso.
Patent Abstracts of Japan, 61233131, Oct. 17, 1986, Kazuichi.

* cited by examiner

TOP VIEW

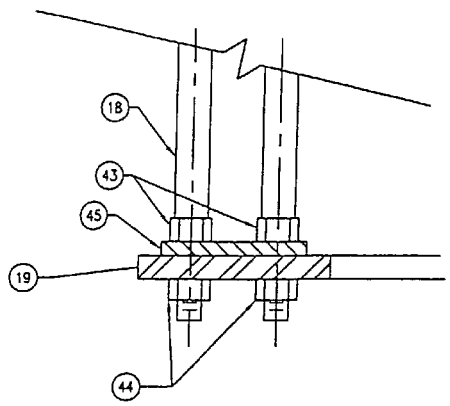
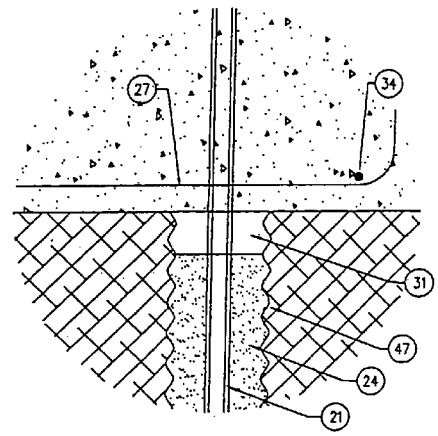
FIGURE 5                FIGURE 6
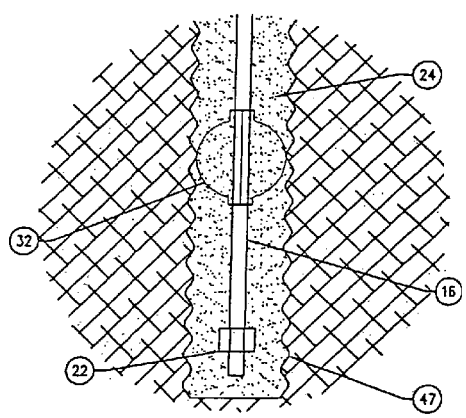
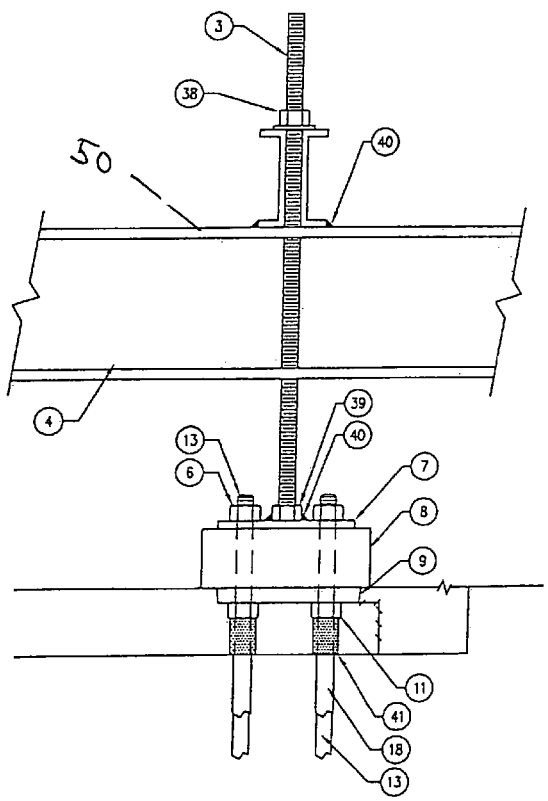
FIGURE 7                FIGURE 8

PILE ANCHOR FOUNDATION

BACKGROUND OF THE INVENTION

1. Field of the Invention

This invention relates in general to concrete support foundations constructed in-situ particularly useful for supporting tall, heavy and/or large towers which may be used to support wind turbines, power lines, street lighting and signals, bridge supports, commercial signs, freeway signs, ski lifts and the like. More specifically, the pile anchor foundation of the present invention is useful in supporting such towers in clay or other fine grain soils which are water bearing and/or too weak to stand or maintain the dimensions of an excavation formed to receive a concrete foundation. Such soils can be found in the midwest region of the United States.

2. Description of Related Art

My earlier U.S. Pat. Nos. 5,586,417 and 5,826,387, entitled Tensionless Pier Foundation and Pier Foundation under High Unit Compression, respectively, and my pending U.S. patent application Ser. No. 10/067,999, filed Feb. 8, 2002 and entitled Perimeter Weighted Foundation for Wind Turbines and the like which is a continuation of U.S. patent application Ser. No. 09/671,282, now abandoned, disclose post-tensioned concrete tower foundations, the disclosures of which are incorporated herein by reference as if fully set forth. The prior art cited in these patents and application may also be relevant to the pile anchor foundation of this invention.

SUMMARY OF THE INVENTION

The foundation of this invention resists supported structure overturn by a multitude of circumferentially spaced post tensioned pile anchors. Each of the pile anchors includes a corrugated metal pipe (CMP) driven into subsurface soils. The CMPs are filled with cementious material securing a centralized bolt or tendon to be post-tensioned from a top surface of a concrete cap positioned above the pile anchors. The pile anchor bolts or tendons are encased, preferably in a plastic sleeve or the like, so that they do not bond to or bear into the upper foundation concrete cap, thus allowing the pile anchor to pull upward until skin friction resistance with the surrounding soils equaling the required tendon tension is achieved. The required bolt or tendon tension exceeds the maximum structure uplift load determined for each pile anchor. The pile anchors of this invention also differ from normal piles in that they are tension piles resisting only overturn uplift, and they do not serve as load bearing compression piles for supporting the structure.

In a conventional pile foundation, the piles extend upwardly through or into an overlying concrete foundation and are both compression and tension resisting foundation extensions. The piles in such foundations are not post-tensioned. The foundation of this invention allows pole and tower structure foundations to be constructed at or below ground surface in weaker water bearing soils susceptible to side wall caving when excavated.

The pile anchor foundation of the instant invention has a circular concrete cap set at or below ground surface which supports a tower from the upper surface thereof. The tower is attached to the concrete cap by a series of circumferentially spaced tower anchor bolts. The tower anchor bolts extend through and are nutted atop a circular tower base flange at the bottom of the tower and below an embedment ring near the bottom of the concrete cap. The tower anchor bolts are also sleeved and shielded so as to prevent the concrete from bonding to the anchor bolts. This structure allows the tower anchor bolts to be elongated and post-stressed between the tower base flange and the embedment ring to alleviate bolt cycling and fatigue.

The tower base flange is set in grout inside a grout trough molded by a template bottom ring. Leveling nuts are threaded onto several tower anchor bolts spaced around and underneath the tower base flange in a blockout void formed by blackouts of foam plastic or the like. The leveling nuts allow the tower to be plumbed vertically and support the base section of the tower while grout is poured into the grout trough under the tower base flange and cured.

Electrical and communication conduits are positioned in and through the concrete cap to allow wiring and conductors to be pulled into the tower. Also, reinforcement rebars are provided at the top and bottom of the concrete cap as well as lapping vertically near the perimeter thereof which are tied and placed radially between the anchor bolts. The rebar reinforcement is intended to resist bending forces in the concrete cap.

The pile anchor tendons or bolts, preferably in plastic sleeves or the like, and most preferably in PVC tubes, extend through the concrete cap and a pile anchor base plate, and into a major extent of the pile anchor cementitious material. The upper end of the tendon or bolt is equipped with a post-tensioning nut threaded thereon to post-tension the pile anchor and the concrete cap after the cementitious material thereof has hardened.

The pile anchors are constructed to terminate below the foundation concrete cap to form a gap which is preferably filled with a compressible material immediately below the foundation cap. The pile anchors around the perimeter are driven lengths of galvanized CMP filled with cementitious material except for the top of the CMP immediately below the bottom of the concrete cap. The cementitious material encases a centralized anchor bolt or tendon sleeved at the top and bare at its bottom with an end nut to facilitate the bottom of the bolt bonding with the cementitious material.

In accordance with the foregoing, it is an object of the present invention to provide a concrete foundation for supporting tall, heavy and/or large towers and/or poles which can be constructed in situ and is especially useful for supporting such towers in clay or other fine grain soils which are water bearing or otherwise too weak to stand or maintain the dimensions of an excavation formed to receive a concrete foundation.

A further object of the present invention is to provide a concrete foundation which includes a generally circular or cylindrical foundation cap set at or below the ground surface to support a tower from the upper surface thereof and a plurality of circumferentially spaced post tensioned pile anchors which depend a substantial distance into the ground below the base of the foundation cap.

Another object of the present invention is to provide a concrete supporting foundation in accordance with the preceding object in which each pile anchor includes an elongated bolt or tendon extending substantially throughout the length of the pile anchor, through the concrete cap and above the top surface thereof, for post tensioning the pile anchors and pull the concrete foundation cap downwardly to compress the underlying bearing soils.

Still a further object of the present invention is to provide the aforementioned bolts or tendons of the pile anchors with plastic sleeves or the like over a major portion of their upper extent to prevent bonding with the concrete in the upper portion of the pile anchor and the concrete cap, facilitate the post tensioning of the pile anchors and eliminate stress reversals and fatigue while the bolts are stretched by jacking or torquing during the post tensioning.

Yet another object of the present invention is to provide a concrete supporting foundation for large and heavy tower structures including a concrete foundation cap and downwardly extending pile anchors which are tension members only and serve to pull the concrete foundation cap downwardly to compress the underlying soils with such a compression force that the concrete foundation cap is always bearing on the underlying soils even under the greatest overturning and uplift forces transmitted to the foundation by the supported structure.

Other objects and advantages of this invention will become apparent from the following description, taken in connection with the accompanying drawings, wherein is set forth by way of illustration and example, embodiments of this invention.

BRIEF DESCRIPTION OF THE DRAWINGS

FIG. 5 is an enlarged fragmentary sectional view of the embedment ring at the bottom of the tower anchor bolts illustrating two nuts, PVC sleeve and a splice plate for connecting segments of the embedment ring.

FIG. 6 is an enlarged fragmental view illustrating the top of a post tensioned pile anchor with the compressible material filling the skin friction development gap between the top of the cementitious material of the pile anchor and the bottom of the foundation cap.

FIG. 7 is an enlarged fragmental view illustrating the bottom of the pile anchor with terminating nut and centralizer.

FIG. 8 is an enlarged fragmental view illustrating the template assembly.

DESCRIPTION OF THE PREFERRED EMBODIMENT

Although one preferred embodiment of the invention is explained in detail, it is to be understood that the invention is not limited in its scope to the details of construction and arrangement of components of this specific embodiment. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 1:
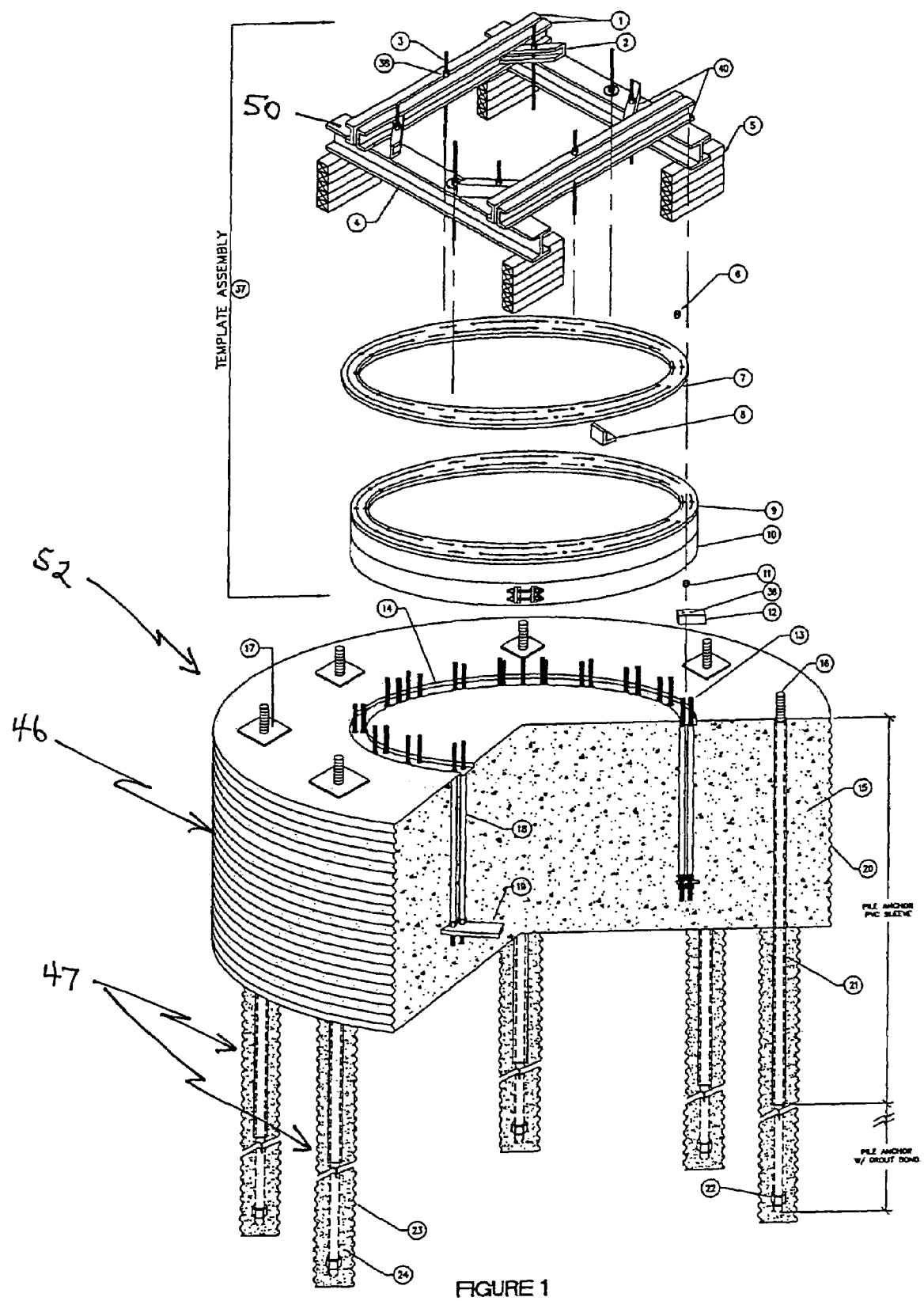
FIG. 1 is an exploded perspective view, partially in section, of the completed cap and pile anchor foundation constructed in accordance with a preferred embodiment of the present invention.
Figure 2:
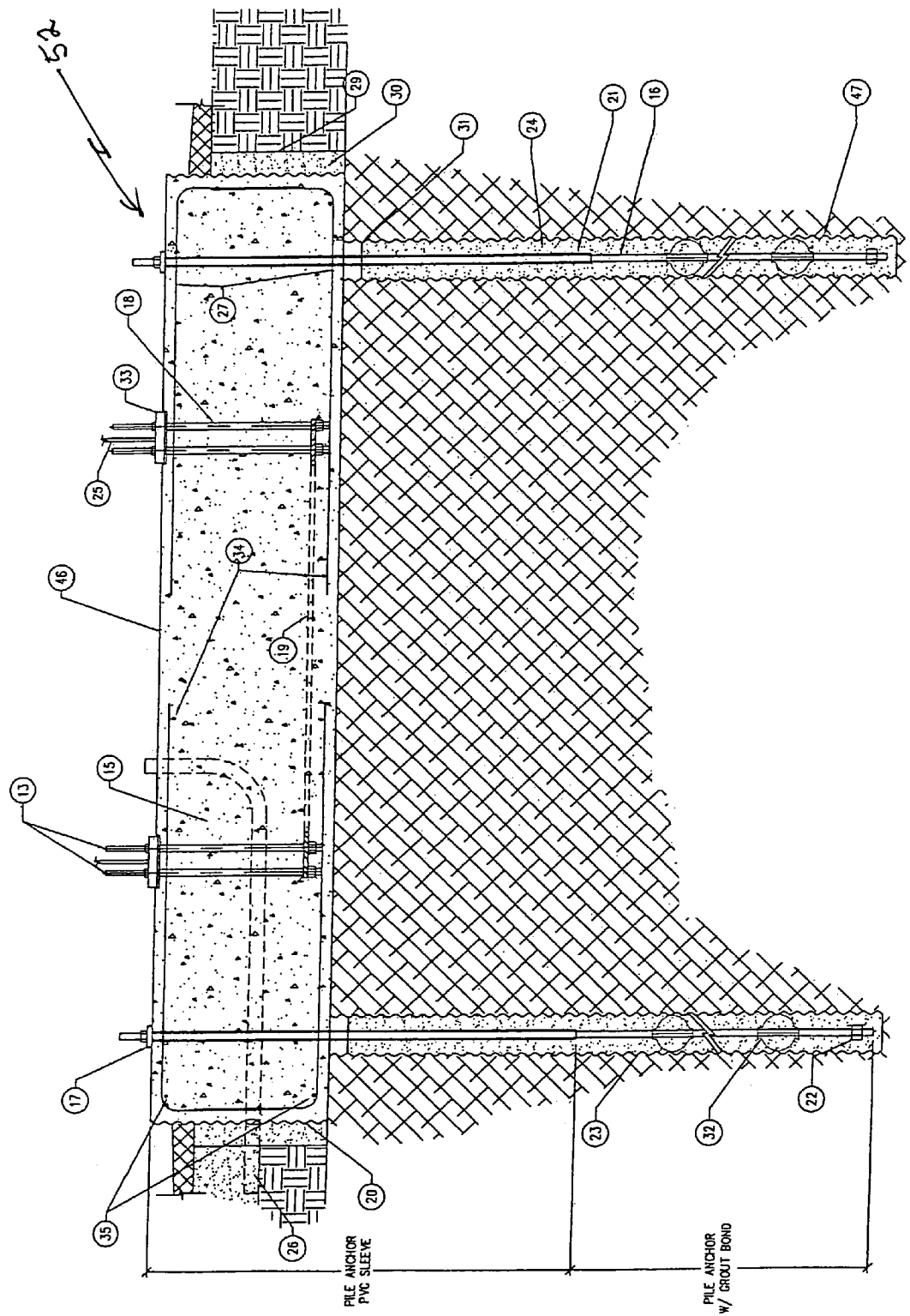
FIG. 2 is a sectional view of the completed foundation with the tower base section flange set in the grout trough, with the concrete cap and pile anchors in accordance with preferred embodiments.

Referring to the drawings, especially FIGS. 1 and 2, the foundation of the present invention is generally designated by reference numeral 52. The foundation 52 of the present invention includes a circular or cylindrical foundation cap generally designated by reference numeral 46 and a series of circumferentially spaced pile anchor assemblies generally designated by reference numeral 47. The foundation cap 46 preferably includes an outer upstanding corrugated metal pipe (CMP) 20 at its perimeter which may, for example, be 24 feet in diameter and 4 feet in height. The outer CMP 20 is placed atop the ground or in an excavation 29 formed in the ground and resting upon the bottom of the excavation 29. (See FIGS. 2 and 4).

Referring to FIG. 2, the void between the outer corrugated metal pipe 20 at the foundation cap perimeter and the edge of the excavation is filled with clean sand or sand cement slurry 30. The foundation cap 46 includes a series of tower anchor bolts 13 spaced circumferentially about the central point of the foundation cap 46 (see FIGS. 2 and 3). The tower anchor bolts 13 may be positioned in radial pairs forming two anchor bolt circles. The inner tower anchor bolt circle has a slightly shorter diameter than the outer tower anchor bolt circle. For example, the outer tower anchor bolt circle diameter may be 14 feet and the inner tower anchor bolt circle diameter may be 13 feet. The anchor bolts 13 are sleeved, preferably with PVC tubes 18, which cover the anchor bolts 13 except for threaded portions at the top and bottom of the bolts (see FIGS. 2 and 5). The anchor bolt sleeves 18 prevent bonding of the bolts 13 to the concrete and grout.

Referring to FIGS. 2 and 5, the lower ends of the tower anchor bolts 13 are anchored near the bottom of the concrete cap foundation 46 with an embedment ring 19 which preferably may be constructed of several circumferential segments lap jointed at 45. The embedment ring 19 is preferably about the same size as and complementary to the tower base flange 33. The ring 19 contains bolt holes for each of the anchor bolts 13. The bolts 13 are secured in the bolt holes by any suitable securement, such as hex nuts 44 below the embedment ring 19 and hex nuts 43 atop the embedment ring as shown in FIG. 5.

Figure 3:
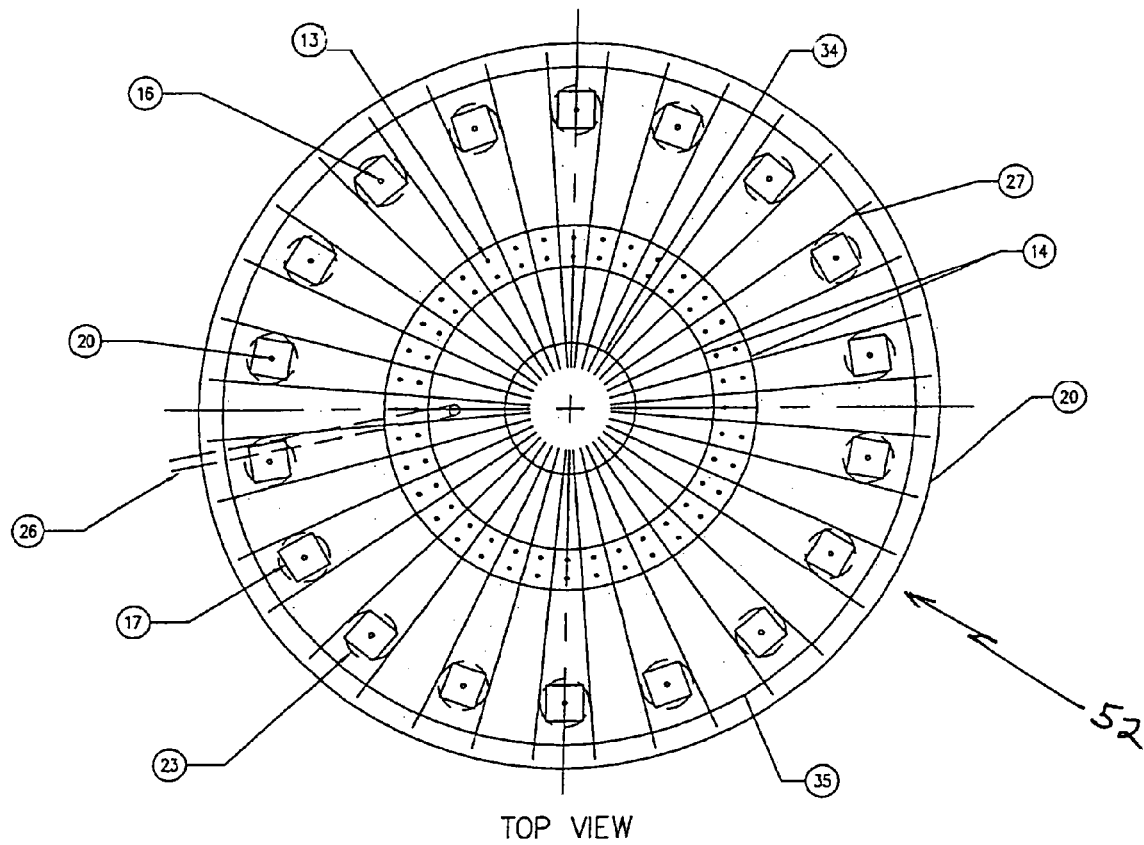
FIG. 3 is a top plan view of the foundation under the template, prior to concrete being poured.
Figure 4:
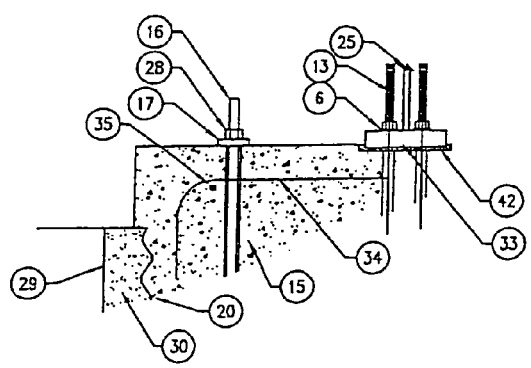
FIG. 4 is an enlarged fragmental view, partly in section, of the completed foundation illustrating the upper pile anchor, the tower anchor bolts and foundation cap with the tower base flange positioned atop the foundation.

Referring to FIGS. 2, 3, and 4, reinforcing steel rebar 34 is positioned radially between the pairs of anchor bolts 13 and the pile anchor bolts 16. The radial steel rebar 34 preferably are placed both near the top and bottom of the concrete cap foundation 46 and are lapped vertically and wire tied near and parallel to the outer CMP 20.

FIGS. 1 and 2 show complete views of the pile anchor assemblies 47. Each pile anchor assembly 47 consists of a pipe, preferably a corrugated metal pipe (CMP) 23, driven into the ground sands, silts, clays, or combinations thereof by a mandrel pile driver. Post-tensioning pile anchor bolts or tendons, preferably all-thread bolts 16 with a nut 22 at the bottom, are centralized in the center of the pile anchor CMP 23 by pile anchor centralizers 32 (see FIGS. 2 and 7). The pile anchor bolts 16 are sleeved, preferably by PVC tubing along a major upper portion 21 of their length to prevent bonding with the concrete foundation cap 46 and pile anchor grout 24 and to allow for post-tension stretching. The portion of the pile anchor bolts 16 below the PVC no bond zone and the bottom nut 22 are encased and secured in position by cementitious grout or concrete 24 pumped to fill the interior of the pile anchor CMP 23. The grout or concrete 24 fills the interior of the pile anchor CMP 23 to within about two (2) feet of the bottom of the concrete foundation cap 46, leaving an unfilled spaced 31 (see FIG. 6). Following concrete pour and cure of the foundation cap 46, the pile anchor base plates 17 are installed over the pile anchor bolts 16 atop the concrete foundation cap, and the post-tensioning nuts 28 are torqued or threaded snugly against the pile anchor plates 17 during the post-tensioning jacking of the pile anchor bolts 16 (see FIG. 4).

Referring to FIGS. 1 and 8, the template assembly is generally designated by reference numeral 37. The template assembly 37 is a temporary structure securing and positioning the anchor bolts 13 and Styrofoam blockouts 12 while forming a recessed tower grout trough 14 during pouring of the concrete for the foundation cap 46 and until the concrete initially sets.

The template assembly 37 consists of a generally square frame structure 50 comprising channels or I-beams 1 and 4 welded or bolted together. The frame structure 50 supports the top ring 7 and bottom ring 9 steel template rings unified and separated by several pieces of angle iron 8 which are welded between the steel template rings 7 and 9. The template rings 7 and 9 have bolt holes in exact vertical alignment to match with the bolt holes in the tower base flange 33. The steel template rings 7 and 9 are suspended below the frame structure 50 by all thread bolts 3 nutted atop the channels or I-beams 1 or 4 by nuts 38 and connected to the top template ring 7 by nuts 39 welded thereto. The nuts 38 can be turned to lengthen or shorten the space between the frame structure 50 and the top of the unified template rings 7 and 9 to allow the unified template rings to be leveled. The frame structure 50 is supported around the perimeter of the excavation 29 by any suitable support structure, such as wooden timbers 5 atop the surrounding ground. The wooden timbers 5 are stacked atop each other to the required height so the template assembly 37 is near level when placed atop the wooden timbers 5 by using a crane.

The blackouts 12 of "Styrofoam" or the like are duct taped underneath the bottom template ring 9 in at least three (3) positions to create voids in the concrete below the bottom of the grout trough 14. These voids allow placement of the tower leveling nuts 11 which support the tower underneath the tower base flange and above the bottom of the grout trough 14. The tower leveling nuts 11 are adjusted by turning in order to plumb the tower to a true vertical position prior to grouting the tower base flange 33 in position. The voids below the grout trough 14 created by the blockouts 12 also provide a space for lowering the leveling nuts 11 after the tower base flange 33 has been grouted into position and the grout has hardened sufficiently to support the tower. Lowering the leveling nuts into their respective blockout void provides a space between the top of the leveling nuts 11 turned down into the blockout void and the underneath side of the base flange 33. This space allows those anchor bolts 13 with the leveling nuts 11 to be elongated by post-tensioning in the same manner as all other anchor bolts 13.

Construction Sequence and Special Features

1. Drive pile anchor CMPs 23 with mandrel pile driver (not shown). The CMPs 23 will initially extend above the ground surface.
2. The pile anchor bolts or tendons 16 with PVC sleeves 18 and centralizers 32 are placed inside the CMPs 23.
3. The pile anchor bolts or tendons 16 are grouted in place by pumping grout or concrete 24 into the pile anchor CMPs 23. The top of the grout 24 should be at least two (2) feet below the bottom of the concrete foundation cap to be constructed, leaving gap 31.
4. The grout 24 of pile anchors 47 is allowed to cure a minimum of twelve (12) hours before excavation (if required) for concrete foundation cap 46.
5. Excavate for concrete foundation cap 46. Hand work required around pile anchor CMPs 23.
6. Place outer CMP 29 in excavation.
7. Cut off pile anchor CMPs 23 at bottom of concrete foundation cap and fill the two (2) feet of each pile anchor CMP with foam or other equivalent compressive filler.
8. Place bolts 13 with thread nuts 43 through holes in segments in embedment ring 19 and thread nuts 44 under embedment ring; install lap joints connecting embedment ring segments.
9. Place reinforcing rebars 34 top and bottom, tie wire rebar to anchor bolts and circular hoops near ends and bend.
10. Pour concrete and finish concrete foundation cap 46.
11. Post-tension pile anchor bolts 16.
12. Pour sand/cement slurry in annular space 30 between the concrete foundation cap 46 and edge of foundation.
13. After seven (7) days, install tower atop concrete foundation cap 46 and post-tension tower anchor bolts 13.

The pile anchor foundation 52 of the present invention provides significant structural and operational advantages as follows:

1. The pile anchors 47 of the pile anchor foundation 52 are tension members only which pull the concrete foundation cap 46 downward compressing the underlying bearing soils with such a compression force that the concrete foundation cap is always bearing on the underlying soils even under the greatest overturning and uplift forces transferred to the concrete foundation cap from the tower structure by the tower anchor bolts 13 atop the foundation cap.
2. The pile anchor bolts or tendons 16 are sleeved to eliminate stress reversals and fatigue while the bolt is stretched by jacking or torquing (post-tensioning).
3. The post-tensioned pile anchor bolts 16 are shielded from bonding with the reinforced concrete of the concrete foundation cap 46 allowing the bolts or tendons 16 to elongate when pulled upward by jacks to the required post-tension. The post-tensioned bolts or tendons 16 are secured in tension by nuts 28 which are threaded atop the pile anchor base plates 17 against the top of the concrete foundation cap 46, thus pulling the cap 46 downward with great compression against the underlying soils. Pile anchor bolts or tendons 16 may be re-tensioned as necessary using thread nuts 28.
4. The pull down/hold down force of the pile anchors 47 results from the post-tensioning of the pile anchor bolts 16 against the pile anchor base plates 17 atop the concrete foundation cap 46. Each pile anchor 47 is pulled upwardly toward the bottom of the concrete foundation cap 46 until the resisting skin friction along the sides of the CMP 23 equals the post-tension of the tension bolt 16 centered in the CMP and restrained by the grout 24. The post-tension downward force atop the concrete foundation cap 46 by each pile anchor 47 should exceed the determined maximum uplift of the pile anchor by a factor of 1.5 or greater.
5. The pile anchors 47 include compressible voids or foam filled spaces 31 between the bottom of the concrete foundation cap 46 and the top of the grout filled pile. The compressible space 31 allows the concrete cap foundation 46 to be pulled downward compressing and consolidating the underlying soils to the required bearing strengths and allowing the pile anchors 47 to pull upward developing the skin friction resistance equal to the pile anchor bolt or tendon post-tension.
6. The pile anchors 47 preferably have corrugated metal pipes 23 around their perimeter to maximize the skin friction resistance with the contacting exterior soils.
7. The pile anchor bolts or tendons 16 are preferably fitted with centralizers 32 to maintain their position in the center of the corrugated metal pipe 23.

8. The pile anchors 47 are filled with cementitious grout or concrete to bond and secure all-thread bolts or tendons 16 as a structural unit with the perimeter corrugated metal pipe 23.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A pile anchor foundation for supporting a heavy load from a ground surface comprising a concrete foundation cap having a bottom surface engaged with said ground surface and an upper surface supporting a heavy load connected rigidly thereto and a plurality of elongated pile anchors depending from said cap, each of said pile anchors including cementitious material extending into underlying soil a substantial vertical depth below said foundation cap, a void or a gap at an upper end of each pile anchor between said cementitious material of each said pile anchor and a bottom surface of said cap, each of said pile anchors further including a tension member anchored thereto and extending upwardly through said respective void or gap and said cap, a lower end of each tension member being anchored in said pile anchor, an upper end of each tension member including a post tensioning assembly which engages an upper surface of said cap to pull said cap downwardly, an upper portion of each tension member being movable in relation to said pile anchor and said cap to enable stretching of said tension member when the post tensioning assembly on the upper end thereof is tightened downwardly against the cap so that said upper end of the pile anchor moves upwardly into said void or gap and said cap is pulled downwardly and compresses underlying soil forming said ground surface, said cap bearing on the underlying compressed soil to withstand overturning and uplifting forces exerted on said cap by said heavy load connected to said cap.

2. The foundation as claimed in claim 1 wherein each of said tension members includes a bolt having a sleeve enclosing a substantial length thereof to prevent the portion of the bolt covered by said sleeve from bonding to said pile anchor and cap and facilitating said post tensioning.

3. The foundation as claimed in claim 1 wherein said foundation cap is generally cylindrical and said elongated pile anchors are circumferentially spaced around said foundation cap.

4. The foundation as claimed in claim 1 wherein a periphery of each said pile anchor is defined by a corrugated metal pipe for a substantial length thereof.

5. The foundation as claimed in claim 1 wherein a periphery of said concrete foundation cap is defined by a corrugated metal pipe.

6. The foundation as claimed in claim 4 wherein said blockout element is said uppermost section of said corrugated pipe.

7. The foundation as claimed in claim 1 wherein said blockout element is made of foam.

8. The foundation as claimed in claim 1 wherein said blackout element has a height of less than about two feet.

9. The foundation as claimed in claim 6 wherein said blockout element has a height of less than about two feet.

10. The foundation as claimed in claim 1 wherein an upper end of each tensioning member is threaded and said post tensioning assembly includes a base plate on the upper surface of said cap and a nut that is received on said threaded end which engages an upper surface of the base plate.

11. A foundation for supporting a tower subject to high overturn loads which comprises a concrete cap defined by vertically spaced top and bottom surfaces and a peripheral wall, said cap adapted to be supported on an upwardly facing soil surface, fastening members rigidly securing said tower to said cap upper surface, a plurality of pile anchors depending from said bottom surface of said cap in spaced relation, said pile anchors positioned in and surrounded by soil underlying said cap with each pile anchor including cementitious material and having an elongated tension bolt anchored therein and extending through said cap, and a post tensioning assembly cooperating with an upper end of each tension bolt and in contact with said top surface of said cap to pull said cap downwardly to compress soil underlying said cap to resist overturning and uplifting forces exerted on said cap by the supported tower, each of said pile anchors including an elongated corrugated pipe substantially filled with cementitious material with said tension bolt being generally centralized therein, each said tension bolt having a lower end anchored in said cementitious material and being sleeved over a major portion of its length to prevent bonding with the cementitious material of the pile anchor and said concrete cap to permit post tensioning of said tension bolts, an uppermost end of each of said pile anchor corrugated pipes forming a void or gap between an upper surface of said cementitious material in said pipe and a lower surface of said cap, said tension bolt extending from said cementitious material of said pile anchor through said void or gap and through said cap, said void or gap enabling the concrete cap to be pulled downwardly to compress and consolidate underlying soil to desired strengths and permitting the pile anchors to move upwardly to develop skin friction resistance against the surrounding soil substantially equal to the pile anchor bolt post tension.

12. The foundation as claimed in claim 11 wherein each of said fastening members includes a tower anchor bolt extending downwardly into said concrete cap, an embedment ring extending peripherally in said concrete cap and being positioned adjacent said bottom surface thereof, each of said anchor bolts having a lower end rigidly affixed to said embedment ring to anchor the supported tower to said cap.

13. The foundation as claimed in claim 12 wherein each of said anchor bolts include a tubular sleeve extending from said embedment ring to prevent said anchor bolts from bonding to said concrete cap.

14. The foundation as claimed in claim 11 wherein said concrete cap includes a grout trough in said top surface to receive and set a supported tower flange in grout in said grout trough by a template bottom ring, removable blockout members supporting said tower flange at spaced points in said trough while grout is poured into the grout trough under the tower flange, leveling nuts on said fastening members engaged with said tower flange to support the tower flange to enable curing of said grout.

15. The foundation as claimed in claim 14 wherein said leveling nuts can be lowered within void spaces formed by removing said blockout members to enable said tower anchor bolts on which the lowered leveling nuts are threaded to be elongated by post tensioning.

16. The foundation as claimed in claim 11 wherein said corrugated pipe is made of a compressible material such that the uppermost portion of said pipe that surrounds said void or gap is compressed by said post tensioning to allow said upward pile anchor movement.

17. A pile anchor foundation for supporting a heavy load from a ground surface comprising:

a concrete foundation cap having a bottom surface engaged with said ground surface and an upper surface supporting a heavy load connected rigidly thereto; and a plurality of elongated pile anchors formed in pile holes that extend from said ground surface into underlying soil beneath said foundation cap a substantial vertical depth, each of said pile anchors including a column of cementitious material having an upper surface and extending to a bottom portion of a respective pile hole, said upper surface of said pile anchor cementitious material and an adjacent area of said foundation cap bottom surface being configured to leave a gap or void between said upper surface of said pile anchor cementitious material and said adjacent area of said foundation cap bottom surface, each of said pile anchors including a tension member having a lower portion anchored in said cementitious material and extending upwardly through said respective gap or void and through said cap, an upper end of each tension member including a post tensioning assembly which engages an upper surface of said cap to pull said cap downwardly, an upper portion of each tension member being movable in relation to said pile anchor and said cap to enable stretching of said tension member when the post tensioning assembly on the upper end of said tension member is tightened downwardly against the cap so that said upper surface of said pile anchor cementitious material moves upwardly into said gap or void, thus reducing a vertical extent of said gap or void between the upper surface of said pile anchor cementitious material and the bottom surface of the cap, and thereby transfers stress to the soil surrounding said pile anchor, said cap being pulled downwardly so as to compress soil underlying said ground surface.

18. The foundation as claimed in claim 17 wherein each of said tension members includes a bolt having a sleeve enclosing said upper portion of said tension member to prevent the upper portion of the bolt covered by said sleeve from bonding to said pile anchor cementitious material and cap and facilitating said post tensioning.

19. The foundation as claimed in claim 17 wherein said foundation cap is generally cylindrical and said elongated pile anchors are circumferentially spaced around said foundation cap.

20. The foundation as claimed in claim 17 wherein an upper end of each tensioning member is threaded and said post tensioning assembly includes a base plate on the upper surface of said cap and a nut that is received on said threaded end which engages an upper surface of the base plate.

21. The foundation as claimed in claim 17 wherein said void or gap is formed by a compressible blackout element positioned above said upper surface of said pile anchor cementitious material.

22. The foundation as claimed in claim 21 wherein said blackout element is made of foam.

23. The foundation as claimed in claim 17 wherein said void or gap has a blockout element made of a compressible material positioned therein.

24. The foundation as claimed in claim 23 wherein said blockout element has a height of less than about two feet.

25. The foundation as claimed in claim 23 wherein said blackout element is made of foam.

* * * * *